July 23, 1968  D. J. EHRLICH  3,393,920
INSULATED VEHICLE BODY CONSTRUCTION
Filed Feb. 21, 1966  2 Sheets-Sheet 1
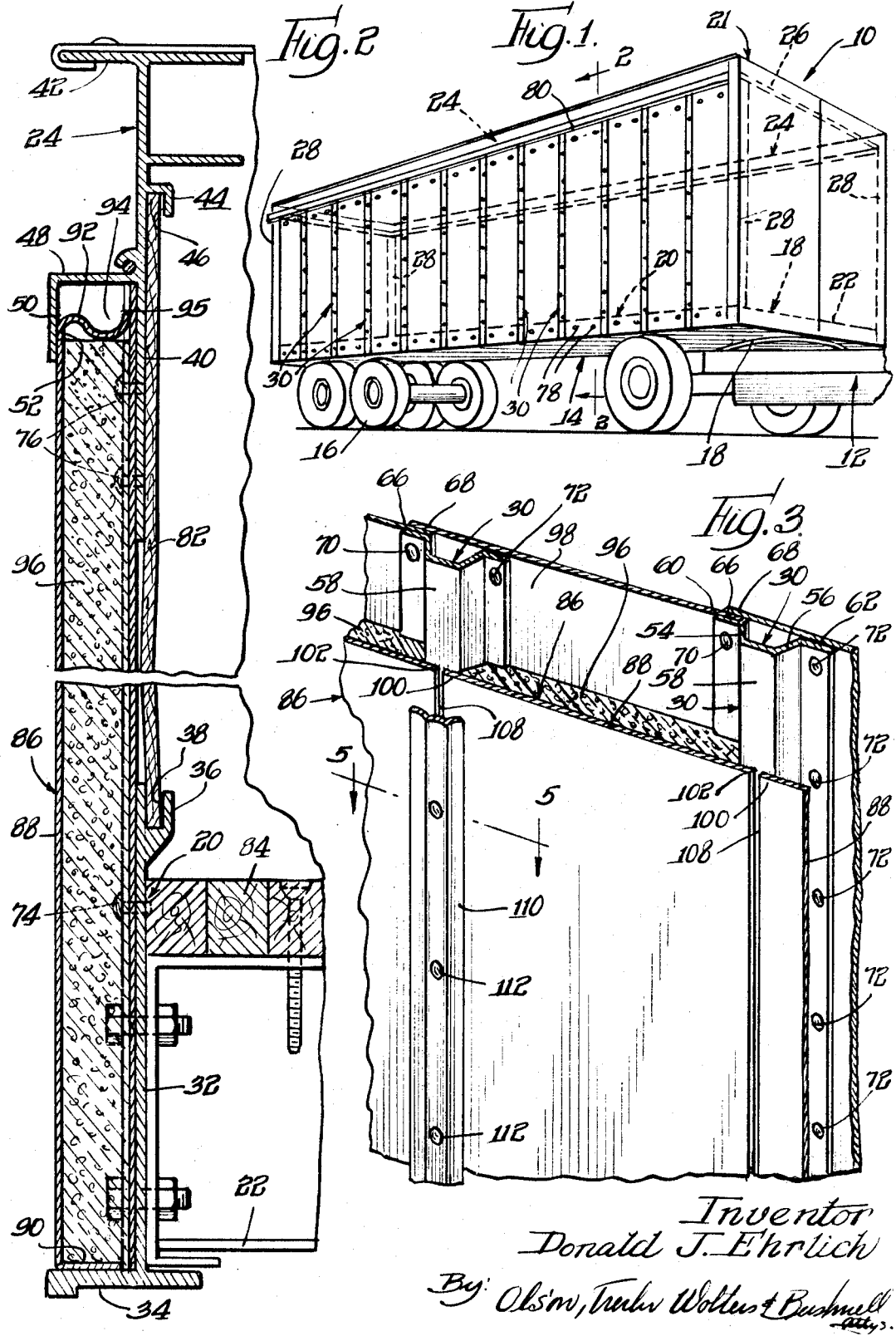
Inventor
Donald J. Ehrlich
By: Olson, Trexler, Wolters & Bushnell
Attys.

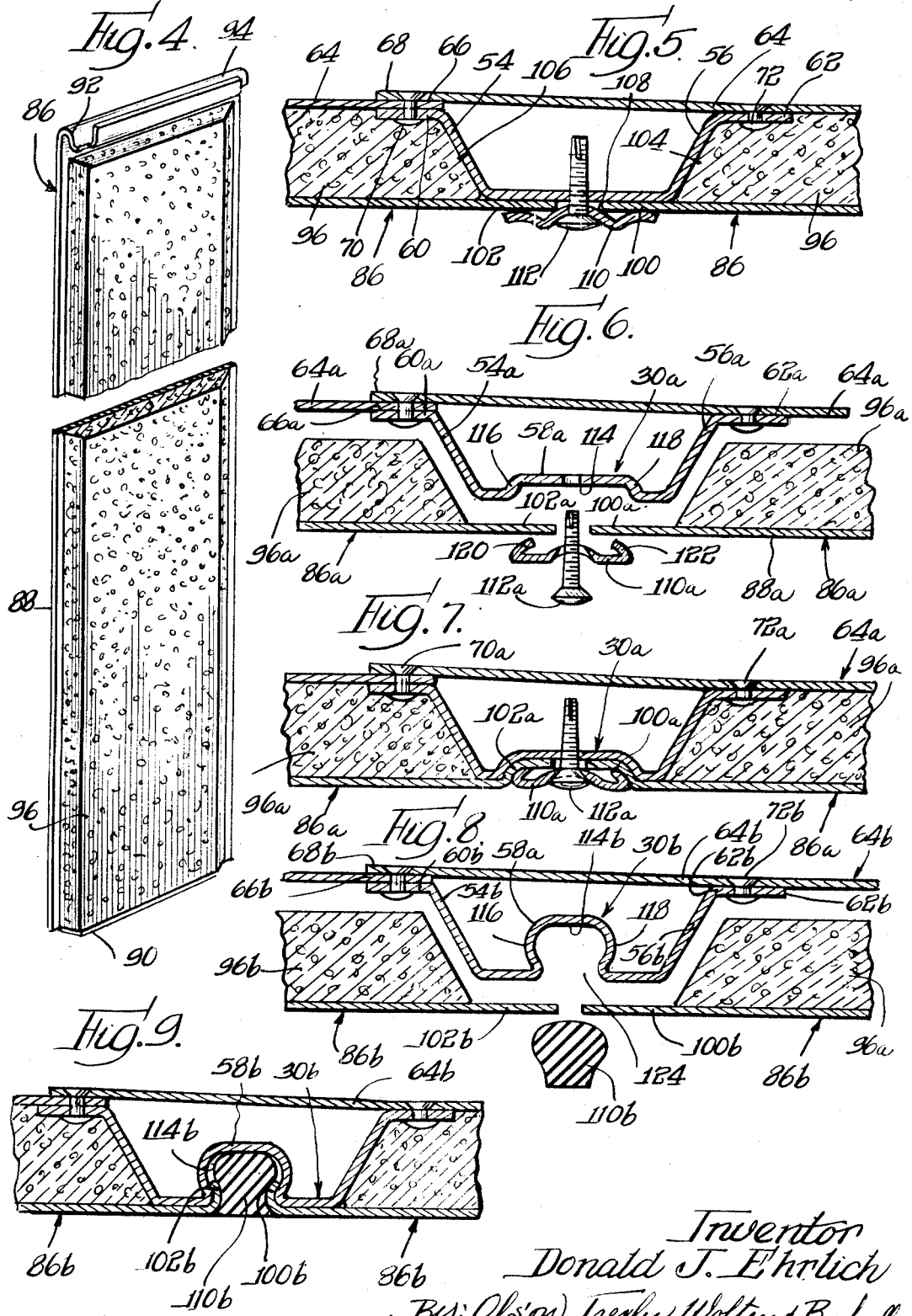

United States Patent Office 3,393,920
Patented July 23, 1968

3,393,920
INSULATED VEHICLE BODY CONSTRUCTION
Donald J. Ehrlich, Monon, Ind., assignor to Monon Trailer & Body Mfg. Company, Monon, Ind., a corporation of Indiana
Filed Feb. 21, 1966, Ser. No. 528,923
6 Claims. (Cl. 280—106)

ABSTRACT OF THE DISCLOSURE

There is disclosed a trailer truck body having side frames comprising spaced vertical posts and upper and lower horizontal members. A sheet metal skin is secured to the inner sides of the posts and panels comprising outer metal sheets and pads of thermal insulating material are disposed between and secured to the posts.

---

The present invention relates to a novel vehicle construction, and more specifically to a novel body construction for trailer trucks and the like.

While features of the present invention may be adapted for use in various types of vehicles and the like, disclosure of the invention will be facilitated by the description of particular embodiments incorporating trailer truck bodies. It has been suggested that such bodies be formed by providing sides with generally vertically extending ribs or posts connected between upper and lower horizontal members and panels or sheet material extending between and riveted or otherwise secured to the upstanding posts. In accordance with one suggestion, such panels are secured to inner surfaces of the posts and to the horizontally extending upper and lower frame members and in accordance with another suggestion the panels are secured to the outer surfaces of the posts.

Construction having the side panel secured to inner surfaces of the posts frequently provide advantages in ease and lower cost of assembly and the greater strength. On the other hand, constructions having the panels secured to outer surfaces of the posts frequently are capable of providing the body with a generally smooth exterior and they also may be more easily insulated.

An important object of the present invention is to provide a novel body construction of the above-described type having insulated walls.

Still another important object of the present invention is to provide a novel panel construction which may be used either in the manufacture of new trailer bodies or the like or presently existing trailer bodies of the type having exposed upstanding side ribs or posts for insulating the walls of the body and providing a generally smooth exterior surface.

Other objects and advantages of the present invention will become apparent from the following description and the accompanying drawings wherein:

FIG. 1 is a fragmentary perspective view of a trailer truck including a trailer body incorporating features of the present invention;

FIG. 2 is an enlarged fragmentary sectional view taken generally along the line 2—2 in FIG. 1;

FIG. 3 is a fragmentary perspective view, partially broken away, showing a portion of a sidewall of the trailer truck body shown in FIGS. 1 and 2;

FIG. 4 is a perspective view showing an insulated panel assembly constructed in accordance with features of the present invention and included in the trailer body construction of FIG. 1;

FIG. 5 is an enlarged fragmentary sectional view taken generally along line 5—5 in FIG. 3;

FIG. 6 is an exploded fragmentary sectional view similar to FIG. 5 but showing a modified form of the present invention;

FIG. 7 is a fragmentary sectional view showing the elements of FIG. 6 fully assembled;

FIG. 8 is a fragmentary exploded sectional view similar to FIG. 6 but showing a further modified form of the present invention; and FIG. 9 is a fragmentary sectional view showing the elements of FIG. 8 in a fully assembled condition.

Referring now more specifically to the drawings wherein like parts are designated by the same numerals throughout the various figures, a truck 10 incorporating features of the present invention is partially shown in FIG. 1 and includes a tractor 12 of known construction and a trailer 14. A rear end portion of the trailer is supported by wheel assemblies 16 and a forward end portion of the trailer is adapted to be connected with a "fifth wheel" 18 of the tractor 12 in a known manner.

The trailer body comprises a generally rectangular base frame 18 having identical but oppositely disposed horizontal and longitudinally extending bottom frame members 20 at opposite sides of the body. The opposite side frame members 20 are joined by a plurality of transversely extending horizontal frame or channel members 22 which may be welded, bolted or otherwise secured to the side frame members 20. The body also has an upper generally rectangular frame structure 21 comprising opposite side horizontally and longitudinally extending frame members 24 joined by transverse horizontally extending frame or channel members 26. The upper frame members are supported above the bottom frame members by corner posts 28 welded, bolted or otherwise secured thereto. In addition, generally vertically extending ribs or posts 30 are spaced from each other along the sides of the truck body and extend between the bottom and upper horizontal frame members or rails 20 and 24. The side posts or ribs 30 are welded, bolted or otherwise secured to the frame members 20 and 24. It is understood that the ribs or posts 30 are spaced along oppositely longitudinally extending sides of the truck body and, in certain constructions, may also be spaced along transversely extending sides or ends of the truck body.

As shown in FIG. 2, each of the bottom longitudinally extending frame members 20 has an upstanding web portion 32 extending from a horizontal flange portion 34. A flange 36 projects laterally inwardly and upwardly from an integral junction with an upper marginal portion of the web 32 for defining a generally U-shaped pocket 38 for a purpose described below.

Each of the upper longitudinally extending frame members 24 comprises a vertically depending web section 40 joined to a horizontal upper flange section 42. A flange 44 projects laterally inwardly and downwardly from an integral junction with the web section 40 for providing a generally U-shaped pocket 46 oppositely from the U-shaped pocket 38. Another flange 48 extends laterally outwardly from the web section 40 and terminates in a downwardly projecting section 50 for defining a relatively large U-shaped pocket or channel 52.

As shown best in FIGS. 3 and 5, each of the upstanding posts or rib members 30 comprises a channel section including oppositely diverging leg portions 54 and 56 joined by a generally flat bight portion 58. Substantially coplanar flanges 60 and 62 project laterally in opposite directions from margins of the leg sections 54 and 56.

The sides of the truck body are closed by a sheet material skin which is secured both to the upstanding posts 30 and to the lower and upper longitudinal extending frame members in order to add structural strength and rigidity. In the embodiment shown the sheet material skin is comprised of panels 64 having a width sufficient to extend between adjacent ribs 30. As shown in FIGS.

3 and 5, adjacent panels 64 have overlapping marginal portions 66 and 68 in alignment with one of the lateral flanges of a rib or post 30. The panels 64 are securely fastened to the flanges 60 and 62 of the post or rib 30 by rivets 70 and 72.

As shown in FIG. 2, the upstanding posts or ribs 30 and the sheet material panels 64 secured thereto are assembled with the upper and lower longitudinally extending frame members in a manner such that the upper ends of the posts fit within the channel 52 while the lower ends of the posts rest on the horizontal flange 34 and the interior surfaces of the sheet material panels abut the substantially vertically aligned exterior surfaces of the web sections 32 and 40. The posts and sheet material panels are securely fastened against the web sections 32 and 40 by a plurality of rivets 74 and 76. Furthermore, lower and upper marginal portions of the panel 64 between adjacent posts 30 are secured to the web sections 32 and 40 by additional rivets 78 and 80 or other suitable fastening means so that the sheet material panels provide an integral part of the frame structure and materially aid in increasing the strength and rigidity of the trailer or truck body.

In order to prevent damage to the sheet material panel 64 which may, for example, be formed from aluminum, the interior surfaces of the body walls are preferably lined by sheets 82 of plywood or the like. The liner sheets 82 have lower and upper margins respectively inserted and retained within the pockets 38 and 46. The floor of the truck body may be formed in a known manner from boards 84 secured to the cross frame members 22.

In accordance with a feature of the present invention panel units 86 are secured to and between the upstanding ribs 30 and over the outer surface of the sheet material panel 64. As shown in FIGS. 3–6, each of the panel units 86 comprises a relatively thin outer sheet material panel 88. While the panel 88 may be formed from various suitable materials, it is preferably formed from a sheet metal such, for example, as aluminum. A lower margin of the panel 88 terminates in an inturned flange 90 while an upper margin terminates in an inturned resilient flexure spring and seal portion 92 having an undulating or reversely bent cross-sectional configuration and terminating in an upstanding free marginal portion 94. The construction is such that the marginal portion 94 is offset from the panel 88 a distance slightly greater than the width of the pocket or channel 52 provided by the upper horizontal and longitudinally extending frame member 24 for resiliently and sealingly engaging a side surface of the channel at 95 as shown in FIG. 2.

A pad 96 of thermal insulating material is adhesively or otherwise secured to the inner surface of the sheet material panel 88 in order to complete each panel unit 86. A variety of known insulating materials may be used for the pad 96 such, for example, as Fiberglas, plastics and foamed materials. Preferably lightweight insulating material is selected so as to minimize the overall weight of the trailer body structure.

The flange 34, adjacent ribs 30 and the channel 52 combined to define recesses or pockets 98 into which the panel units 86 are adapted to be inserted as shown best in FIGS. 2, 3 and 5. The height of the panel units 86 is somewhat less than the overall height of each pocket 98 for facilitating insertion of the panel unit into the pocket by first introducing the upper end of the panel unit into the channel 52 and then positioning the lower flange 90 on the flange 34. The overall thickness of each panel unit 86 is similar to the depth of the the pockets 98 so that the pockets are substantially completely filled by the pads of insulating material.

Opposite vertical marginal portions 100 and 102 are of the panels 88 and project laterally outwardly from edges of the insulating pad 96 of each unit 86 so as to overlap the adjacent ribs or posts 30 as shown in FIGS. 3 and 5. In the embodiment shown, adjacent side edges 104 and 106 of the insulating pads 96 are bevelled so as to conform with the diverging configuration of the rib leg sections 56 and 54 respectively. Furthermore, the insulating material is preferably relatively soft so that it will mold to conform to the contour of the pocket 98 when pressed into position.

As shown in FIGS. 3 and 5, the combined lateral extent of the marginal portions 100 and 102 is less than the width of the post or rib bight portion 58 to provide a slight gap or slot 108 therebetween. In order to secure the panel units 86 in assembled relationship, an elongated clamping strip 110 is applied over the marginal portions 100 and 102 and across the gap or slot 108. Screws 112 or the like are inserted through the strip 110, the gap 108 and through the bight portion 58 of the post or rib 30. It will be appreciated that with this structure, the panel units may be quickly and easily assembled with the remainder of the body structure. Furthermore, the panel units not only provide the body structure with insulated walls, but also with a substantially smooth outer surface. The construction enables the panel unit to be applied not only to new trailer bodies, but also to many trailer or truck bodies now in existence.

FIGS. 6 and 7 show a slightly modified form of the present invention which is similar to the structure described above as indicated by the application of identical reference numerals with the suffix $a$ added to corresponding elements. This embodiment differs only in the construction of the ribs or posts 30$a$ and the clamping and sealing strip 110$a$. More specifically, the bight portion 58$a$ of the post or rib 30$a$ is formed with a longitudinally extending outwardly facing channel 114 having opposite diverging sidewalls 116 and 118. The clamping strip 110$a$ is formed with opposite end portions 120 and 122 conforming generally to the diverging walls 116 and 118. Thus when the clamping strip is tightened as shown in FIG. 7, the marginal portions 100$a$ and 102$a$ of the panel units are folded into the recess or channel 114 and clamped against the walls 116 and 118 to provide a more secure connection. Furthermore, this arrangement enables the clamping strip 110$a$ and the securing elements or screws 112$a$ to be substantially completely recessed beneath the outer surface of the panel units 86 so as to further improve the smooth appearance and construction of the overall trailer body.

FIGS. 8 and 9 show another slightly modified form of the present invention which is similar to the structure described above as indicated by the application of identical reference numerals with the suffix $b$ added to corresponding elements. In this embodiment a relatively deep channel or slot 114$b$ is formed in the bight portion of the post or rib 30$b$, which channel has opposite sides 116$b$ and 118$b$ which converge toward each other to define a narrow throat 124. Furthermore, a clamping strip 110$b$ is provided in the form of an elongated body of flexible and elastic material such as rubber or plastic having a cross-sectional configuration similar to that of the channel 114$b$. The parts are assembled from the position shown in FIG. 8 to the position shown in FIG. 9 by positioning the panel units 86$b$ against the ribs or posts and then pressing the strip 110$b$ through the restricted throat 124 and into the channel 114$b$.

While preferred embodiments of the present invention have been shown an described herein, it is obvious that many structural details may be changed without departing from the spirit and scope of the appended claims.

The invention is claimed as follows:

1. A vehicle body structure comprising frame means defining side walls, said frame means including side members defining a plurality of pockets along said side walls, said frame means side members including upper and lower generally horizontally extending members and a plurality of upstanding post members secured to the upper and lower frame members, sheet material secured to inner sides of said post members and closing a side of said pockets, thermally insulated panel units respectively secured within said pockets between said post members and secured to outer sides thereof, each of said panel units comprising an outer sheet material panel member and a pad of thermal insulated material disposed against an inner surface of said panel member, each of said sheet material panel members having marginal portions projecting laterally from edges of said pad and overlying adjacent post members, and fastening means securing said marginal portions to said post members, said marginal portions of adjacent panel units overlying an outer side of a post member therebetween, said post member outer side having an elongated channel therein with a restricted throat, said marginal portions projecting into said channel, and said fastening means including an elongated strip pressed into said channel.

2. A vehicle body structure comprising frame means defining side walls, said frame means including side members defining a plurality of pockets along said side walls, said frame means side members including upper and lower generally horizontally extending members and a plurality of upstanding post members secured to the upper and lower frame members, sheet material secured to inner sides of said post members and closing a side of said pockets, thermally insulated panel units respectively secured within said pockets between said post members and secured to outer sides thereof, each of said panel units comprising an outer sheet material panel member and a pair of thermal insulated material disposed against an inner surface of said panel member, said upper generally horizontal frame member including laterally outward projecting and downwardly opening channel means having opposed side surfaces, said panel units having upper ends disposed within said channel means between said surfaces, and said sheet material panel of each of said panel units including an upper end marginal portion projecting transversely of said panel unit and resiliently sealingly engaging one of said surfaces.

3. A panel unit for a vehicle body of the type described comprising a resilient sheet material panel member, a pad of thermal insulating material secured against an inner surface of said panel member, said panel member including opposite marginal portions extending laterally outwardly of adjacent opposite edges of said pad, and flange means along an end edge portion of said panel member and projecting transversely of said panel unit, said flange means having an undulating cross-section and a marginal portion extending generally parallel to said panel and presenting a surface for sealingly engaging a surface of a vehicle body when the panel unit is installed.

4. In a vehicle, a base frame, wheel means supporting said base frame, frame means on said base frame defining side walls, said frame means including side members defining a plurality of pockets along said side walls, said frame means side members including upper and lower generally horizontally extending members and a plurality of upstanding post members secured to the upper and lower frame members, said lower member comprising a laterally outwardly extending flange, said upper member including laterally outward projecting and downwardly opening channel means having opposed side surfaces, thermally insulated panel units disposed in said pockets between said post members, each of said panel units comprising an outer sheet material panel member and a pad of thermal insulated material disposed against an inner surface of said panel member, each of said sheet material panel members having marginal portions projecting laterally from edges of its associated pad and overlying adjacent post members, said panel units having upper end portions extending into said channel means and lower end portions substantially abutting said flange, fastening means securing said marginal portions to said post members, and sheet material means secured to inner sides of said post members and closing a side of said pocket oppositely from said panel units.

5. A vehicle body structure, as defined in claim 4, wherein marginal portions of adjacent panel units overlie an outer side of a post member therebetween, and said fastening means includes an elongated strip overlying said adjacent marginal portions, and a plurality of fastening elements extending through said strip and into said post member.

6. A vehicle body structure, as defined in claim 5, wherein said post member has channel means in said outer side thereof, said marginal portions of adjacent panel units extending into said channel means, and said elongated strip being substantially inserted in said channel means.

References Cited

UNITED STATES PATENTS

| | | | |
|---|---|---|---|
| 1,522,708 | 1/1925 | Andrews. | |
| 1,558,323 | 10/1925 | Whyte. | |
| 2,268,517 | 12/1941 | Small | 52—481 |
| 2,335,220 | 11/1943 | Edwards | 52—406 X |
| 2,585,976 | 2/1952 | Teeter. | |
| 2,747,703 | 5/1956 | Broberg | 52—300 |
| 2,943,367 | 7/1960 | Wong | 52—497 X |
| 3,034,824 | 5/1962 | Schubach | 296—28 |
| 3,174,590 | 3/1965 | Haker | 52—497 X |

BENJAMIN HERSH, *Primary Examiner.*

J. A. PEKAR, *Assistant Examiner.*

UNITED STATES PATENT OFFICE
CERTIFICATE OF CORRECTION

Patent No. 3,393,920                                    July 23, 1968

Donald J. Ehrlich

It is certified that error appears in the above identified patent and that said Letters Patent are hereby corrected as shown below:

Column 2, line 39, "oppositely" should read -- opposite --.
Column 5, line 31, "pair" should read -- pad --.

Signed and sealed this 30th day of December 1969.

(SEAL)
Attest:

Edward M. Fletcher, Jr.
Attesting Officer

WILLIAM E. SCHUYLER, JR.
Commissioner of Patents